United States Patent [19]

Davis

[11] 4,330,957
[45] May 25, 1982

[54] BEAN MACHINE

[76] Inventor: Gary L. Davis, 325 W. Glovers La., Farmington, Utah 84025

[21] Appl. No.: 180,517

[22] Filed: Aug. 25, 1980

[51] Int. Cl.³ .............................................. A01G 31/02
[52] U.S. Cl. .......................................... 47/14; 47/84
[58] Field of Search .................... 47/14, 16, 60–61, 47/84

[56] References Cited

U.S. PATENT DOCUMENTS 4,006,557  2/1977  Sawyer ............................. 47/14 X
4,135,331  1/1979  Lamlee ............................... 47/61

FOREIGN PATENT DOCUMENTS 1023942  1/1978  Canada ................................. 47/14
2033714  5/1980  United Kingdom ................. 47/14

Primary Examiner—Robert E. Bagwill
Attorney, Agent, or Firm—B. Deon Criddle

[57] ABSTRACT

A low-cost, self-contained and compact sprouting device and a simple method of use of the same. The device comprises a container having a perforated top inset tray, perforated bottom whereon the seeds are washed and sprouted, and a top cover serving as a water storage receptacle when inverted and placed under the container. A disposable cover or wash-away coating seals the openings through the bottom until plant growth is desired.

3 Claims, 4 Drawing Figures

BEAN MACHINE

BRIEF DESCRIPTION OF THE INVENTION

1. Field of the Invention

The invention relates to sprouting devices and, more particularly, low-cost, self-contained sprout packages and methods for use of such packages.

2. Prior Art

In the past, many low-cost plant packages have served primarily to facilitate transportation and temporary storage. U.S. Pat. Nos. 3,971,160 and 4,189,868, for example, each disclose a packaging combination for shipping and preserving living plants or organic pellets. Other plant packages such as those disclosed in U.S. Pat. Nos. 3,827,217, 4,069,917, and 4,167,080, are low-cost plant containers, like the sprouting device of the present invention, but generally serving as containers for nursery plants and the like. U.S. Pat. No. 4,167,080 has a bottom drain dish similar to the water storage receptacle of the present invention, but, unlike the receptacle of the present invention, the drain dish has a snap-in feature and does not further serve as a top cover.

SUMMARY OF THE INVENTION

A primary object of the present invention is to provide a low-cost, self-contained and compact sprouting device.

Another object is to provide a sprouter that serves as its own sales package, including seeds to be sprouted.

A further object is to provide a simple method for convenient use of the sprouting device.

Principal features of the present invention include a container having a perforated top inset tray, a perforated bottom, a tear-away bottom seal, and a top cover also serving as a water storage receptacle when inverted and placed under the container. In the preferred use, the seeds to be sprouted are included as part of the package and are placed on the perforated bottom during packaging and prior to purchase. In order to use such a "pre-planted" package, the purchaser need only tear away the bottom seal and remove the top cover and wash the seeds by directing water down through the perforated top inset tray and out through the perforated bottom. The perforated top inset tray permits the flow of wash water through the container while limiting light access to seeds placed on the perforated bottom. The perforated bottom is spaced well below the perforated top inset tray and the holes through the top tray are made small so that little light enters the container through the holes to retard germination of the seeds and growth of the plants. To check germination and growth, the perforated top inset tray may be removed and the seedlings observed or removed as desired.

Further objects and features of the present invention will become apparent from the following detailed description taken together with the drawings.

DRAWINGS

FIGS. 1a and 1b are perspective view of two embodiments of the sprouting device of the present invention showing the "pre-planted" package, prior to use by a purchaser;

FIG. 2, a perspective view of one embodiment of the sprouting device of the present invention showing the preferred use of the package, especially illustrating use of the top cover as a water storage receptacle; and FIG. 3, is a cross-sectional view taken on the line 3—3 of FIG. 1a.

DETAILED DESCRIPTION

Figure 1A:
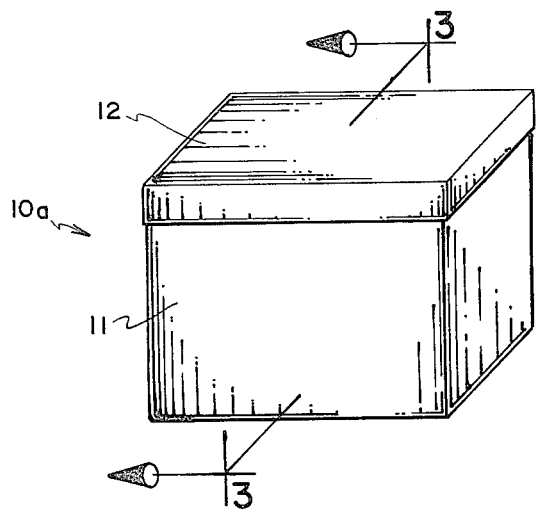
Figure 1B:
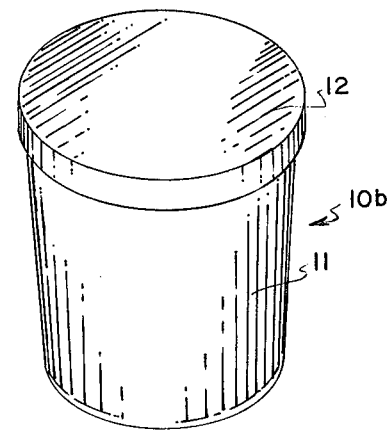
Figure 2:
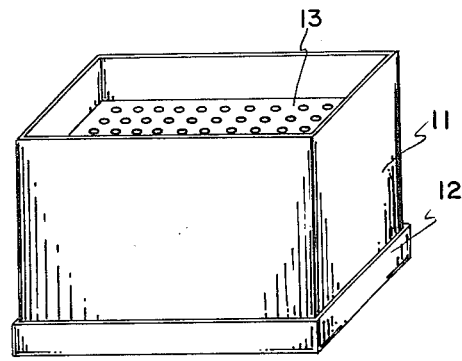

FIGS. 1a and 1b, respectively, illustrate two of the possible configurations 10a and 10b, of the sprouting device 10 of the present invention. In each configuration the sprouting device 10 includes a container 11 and a top cover 12. As shown in FIG. 2, the top cover 12 also serves as a water collector when placed under the container 11. The inside 12a (FIG. 3) of the top cover 12 is preferably water proofed to allow for water collection.

Figure 3:
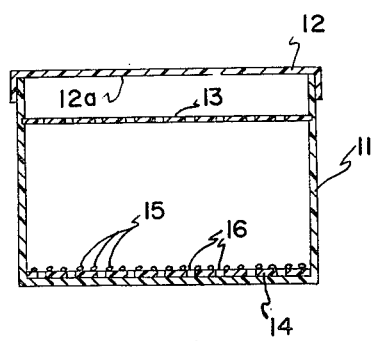

As illustrated in FIGS. 2 and 3, the sprouting device 10 further includes a removable, perforated top inset tray 13 and a perforated bottom 14 upon which seeds 15 rest to be sprouted are placed. Both the top inset tray 13 and the bottom 14 are perforated in order to allow washing of the seeds 15 under a stream of water without removal of the top inset tray 13 and exposure of the seeds 15 to the light. When the seeds have germinated, and grown however, the top inset tray 13 may be readily removed for easy access to the seedlings. A tear-away seal 16 is affixed to the underside of bottom 14 to keep dirt, insects, etc. out of the container and away from the seeds before the seeds are to be germinated by a user. The seal 16 preferably is merely a sheet of paper adhesively secured to the underside of bottom 14 and easily removed therefrom.

Normally the seeds 15 are included within the container 11 when the sprouting device 11 is purchased by a user. The purchaser, then germinates the seeds by removing the top cover 12 and filling the container with water to thoroughly soak the seeds. The tear-away seal 16 is then removed and the water drains from the seeds and is discharged through the perforated bottom 14. Periodically, the seeds are rinsed by placing the container under a stream of water and allowing the stream to be broken up by the inset tray 13 so that the seeds are gently washed. This periodic washing insures good plant growth free from fungus or disease. After soaking and after each washing the top cover 12 is placed under the container 11 as a drip tray. The top inset tray 13 limits light access to the interior of the container, while permitting good air circulation as the seedlings sprout in the moist, dark environment created above the bottom 14. While not shown, the bottom 14 may be coated with a material that will close the perforations therethrough, but that will dissolve when subjected to water. With such a coating, it is not necessary to use the tear-away seal 16.

Although preferred embodiments of the sprouting device have been illustrated, it will be recognized that other embodiments are possible without departing from the spirit and scope of the invention as outlined in the claims, which claims I regard as my invention.

I claim:

1. A sprouting device for the controlled germination and growth of seeds comprising
    a container;
    a perforated top inset tray fitting snugly within the container near an upper end thereof;
    a perforated bottom closing a lower end of the container, the perforations in the top inset tray and the bottom being smaller than the seeds to be germinated;

a top cover adapted to close the upper end of the container as a lid and to receive the lower end of the container as a drip container; and removable means sealing the perforations in the bottom.

2. A sprouting device as in claim 1, further including seeds to be germinated carried by the perforated bottom.

3. A sprouting device as in claim 2, wherein the removable means sealing the perforations in the bottom comprises a tear-away seal attached to an underside of the bottom.

* * * * *